United States Patent
Terrell

(10) Patent No.: US 8,996,152 B2
(45) Date of Patent: Mar. 31, 2015

(54) OPERATING SYSTEM AWARE HARDWARE MUTEX

(75) Inventor: James R. Terrell, Charlotte, NC (US)

(73) Assignee: NVIDIA Corporation, Santa Clara, CA (US)

( * ) Notice: Subject to any disclaimer, the term of this patent is extended or adjusted under 35 U.S.C. 154(b) by 2113 days.

(21) Appl. No.: 11/427,015

(22) Filed: Jun. 28, 2006

(65) Prior Publication Data

US 2008/0005740 A1    Jan. 3, 2008

(51) Int. Cl.
  *G06F 9/46* (2006.01)
  *G06F 19/00* (2011.01)
  *G06F 9/52* (2006.01)

(52) U.S. Cl.
  CPC ..................................... *G06F 9/526* (2013.01)
  USPC ......................................................... 700/100

(58) Field of Classification Search
  None
  See application file for complete search history.

(56) References Cited

U.S. PATENT DOCUMENTS

| | | | |
|---|---|---|---|
| 5,678,026 A | | 10/1997 | Vartti et al. |
| 5,956,712 A | | 9/1999 | Bennett et al. |
| 6,105,049 A | * | 8/2000 | Govindaraju et al. ........ 718/102 |
| 6,105,085 A | * | 8/2000 | Farley .............................. 710/41 |
| 6,112,222 A | * | 8/2000 | Govindaraju et al. ........ 718/102 |
| 6,230,230 B1 | | 5/2001 | Joy et al. |
| 6,496,909 B1 | | 12/2002 | Schimmel |
| 6,499,048 B1 | | 12/2002 | Williams |
| 6,950,945 B2 | * | 9/2005 | Pfister et al. ................... 718/104 |
| 7,120,762 B2 | * | 10/2006 | Rajwar et al. ................. 711/150 |
| 7,290,105 B1 | | 10/2007 | Jeter et al. |
| 7,340,743 B1 | * | 3/2008 | Anural et al. ................. 718/104 |
| 7,409,506 B2 | | 8/2008 | Kamigata et al. |
| 7,721,291 B2 | * | 5/2010 | McKenney ................... 718/104 |
| 8,086,579 B1 | * | 12/2011 | Chandrasekaran et al. .. 707/704 |
| 2002/0078123 A1 | | 6/2002 | Latour |
| 2003/0120903 A1 | * | 6/2003 | Roussel ......................... 712/221 |
| 2004/0025069 A1 | | 2/2004 | Gary et al. |
| 2006/0117316 A1 | | 6/2006 | Cismas et al. |

* cited by examiner

*Primary Examiner* — Mengyao Zhe

(57) ABSTRACT

Hardware resource sharing for a computerized system running software tasks. A mutex controller is associated with the hardware resource. Lock and unlock indicators are settable by a software task and readable by the controller, and locked and waiters flags are settable and readable by the controller. The controller monitors whether the lock indicator has been set and determines whether the locked flag is set. If not, it sets the locked flag and, if so, it sets the waiters flag and asserts a mutex interrupt signaling the computer system to divert the software task to run a lock request routine. The controller also monitors whether the unlock indicator has been set and then determines whether the waiters flag is set. If not, it clears the locked flag and, if so, it asserts a mutex interrupt signaling the computer system to divert the software task to run an unlock request routine.

33 Claims, 3 Drawing Sheets

OPERATING SYSTEM AWARE HARDWARE MUTEX

TECHNICAL FIELD

The present invention relates generally to input and output in electrical computers and digital data processing systems, and more particularly to means or steps for controlling access to shared resources in such systems.

BACKGROUND ART

FIG. 1 (background art) is a block diagram depicting how a modern computerized system can be a complex environment. Generally, one or more software processes are present and employ one or more hardware resources. The software processes can be executing on a single or on multiple processors, and can potentially have multiple threads of execution. For simplicity, each portion of a software process or processes of concern herein is simply termed a "software task."

In modern a computer operating system (OS) mutex primitives are widely used to protect shared resources from overlapping multi-threaded software access. This is desirable because in most critical-section applications, one or more tasks need to share a resource (e.g., a common data area, a hardware resource, or some other single-access resource). Typically, actual contention for the shared resource is relatively rare, and this mutex protection mechanism is only needed to handle infrequent occasions when more than one task attempts to change a resource at the same time.

Given that the actual resource contention is rare, the processing time required to lock and unlock mutexes is largely wasted effort. The lock and unlock operations often must invoke the kernel of the OS, which can be fairly burdensome in terms of the computing time expended. This is especially the case in a real-time operating system (RTOS). As mutex operations become more burdensome, the critical software sections must be made more coarse-grained, since it becomes less and less economical to lock and unlock the resource in a fine-grained manner due to the overhead this would add.

Furthermore, the management of traditional mutexes by software often requires that processor interrupts be globally disabled while checking and maintaining the states of mutex variables stored in system memory. This is desirably avoided because disabling the interrupts, especially in a RTOS, adds potential latency to the interrupt response.

Another consideration when using software mutexes is priority inversion. A priority inversion occurs when a lower priority task has locked a mutex, and is then blocked for some reason. When a higher priority task then attempts to lock the mutex it is blocked until the lower priority task unlocks the mutex. In the meantime, tasks of intermediate priority may execute, causing the high priority task to wait for an indeterminate amount of time. This is termed "priority inversion" because tasks of intermediate priority are allowed to take precedence over the high priority task indefinitely.

A common solution to the priority inversion problem is to use an OS mutex lock code to temporarily boost the priority of the task which is holding the mutex lock to the same priority as the task which is waiting to acquire the lock. But this adds yet more complexity in implementation and overhead in operation.

Accordingly, what is needed is a mechanism that eliminates or significantly reduces the lock and unlock overhead under non-contending conditions in the kernel of an OS, and that streamlines the response whenever contention does occur. Preferably, such a mechanism should also eliminate the need to disable processor interrupts to check and manage mutexes. And preferably such a mechanism should reduce the burdens of handling priority inversion.

DISCLOSURE OF INVENTION

Accordingly, it is an object of the present invention to provide a hardware assisted or based mutex.

Briefly, one preferred embodiment of the present invention is a system for sharing a hardware resource in a computer system able to run at least one software task. A mutex controller associated with the hardware resource is provided. A lock indicator and an unlock indicator that are set able by the software task and read able by the mutex controller, and a locked flag and a waiters flag that are set able and read able by the mutex controller are also provided. The mutex controller is then able to monitor whether the lock indicator has been set and determine then whether the locked flag is set. If not, it can set the locked flag and, if so, it can set the waiters flag and assert a first mutex interrupt signaling the computer system to divert the software task to run a lock request service routine. The mutex controller is also able to monitor whether the unlock indicator has been set and then determine whether the waiters flag is set. If not, it can clear the locked flag and, if so, it can assert a second mutex interrupt signaling the computer system to divert the software task to run an unlock request service routine.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

Figure 1:
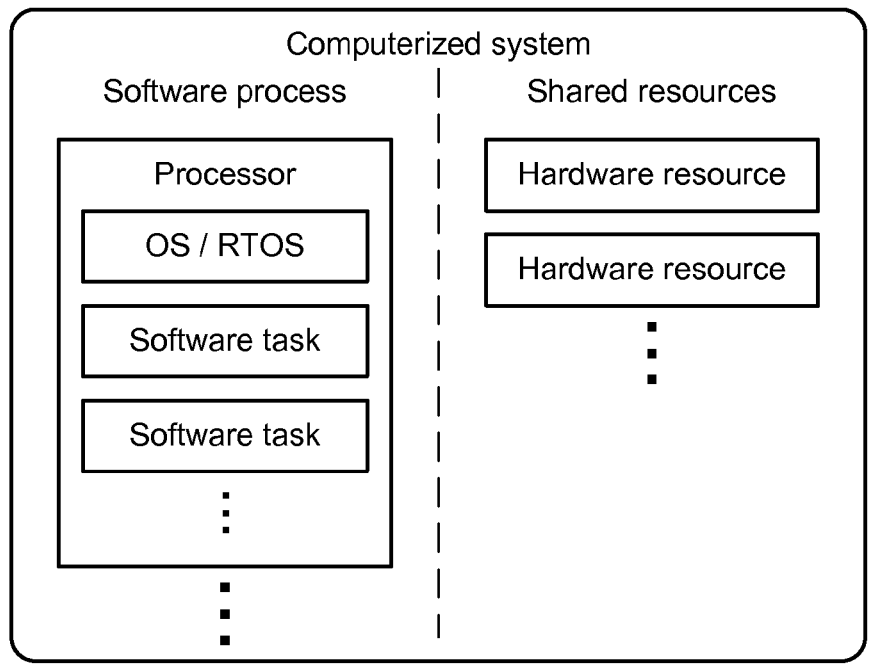
FIG. 1 (background art) is a block diagram depicting how a modern computerized system can be a complex environment.

A preferred embodiment of the present invention is a hardware mutex (HWM). As illustrated in the various drawings herein, and particularly in the view of FIG. 2, preferred embodiments of the invention are depicted by the general reference character 10.

Figure 2:
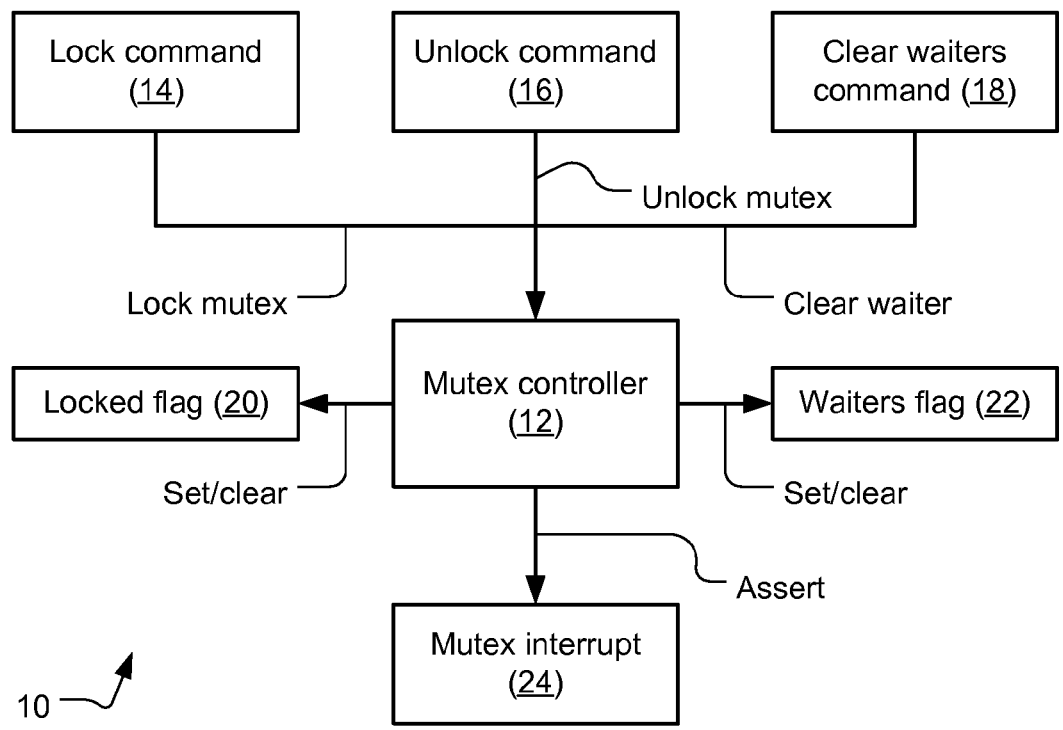
FIG. 2 is a block diagram showing the major components of a hardware mutex (HWM) in accord with the present invention.

FIG. 2 is a block diagram showing the major components of a HWM 10 in accord with the present invention. A mutex controller 12 for a shared hardware resource monitors a lock command register 14, an unlock command register 16, and a clear waiter command register 18 for indications from a software task. The mutex controller 12 then sets or clears a locked flag 20 and a waiters flag 22, as discussed below, and can assert a mutex interrupt 24.

Figure 3:
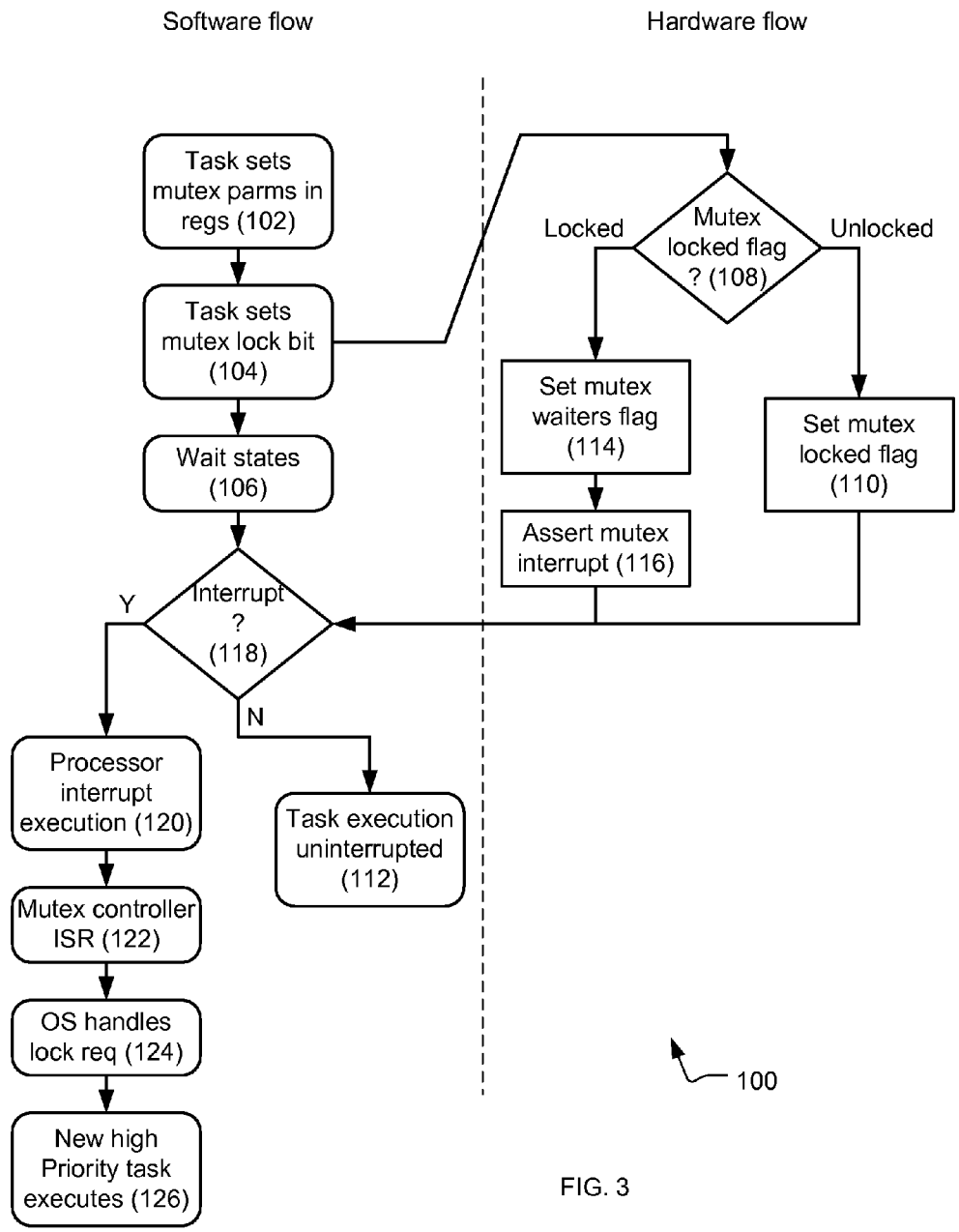
FIG. 3 is a flow chart showing a mutex lock process in accord with the present invention.

FIG. 3 is a flow chart showing a mutex lock process 100 in accord with the present invention. The software task related steps here are shown on the left and the shared hardware resource related steps are shown on the right.

In an optional step 102 an executing software task first sets optional parameters into processor registers or other locations that are well-known to the OS. Some examples of such parameters are wait timeout values, and block versus non-blocking flags. In a step 104 the software task next sets a mutex lock bit in the lock command register 14, and in an optional step 106 wait states can be inserted to prevent the software task from executing instructions while the mutex controller 12 evaluates and acts on the lock request.

Separately, in a step 108 the mutex controller 12 monitors the lock command register 14 to determine the state of the HWM 10 (i.e., whether it has been requested to lock). If not, in a step 110 the mutex controller 12 sets the locked flag 20 (but does not assert the mutex interrupt 24). That is, it "silently" sets the flag and execution of the software task simply continues, with no interruption, at the instruction following the mutex lock process 100 (and any optional wait states) (i.e., at a step 112). Alternately, however, if it is determined in step 108 that the HWM 10 has already been locked, in a step 114 the mutex controller 12 sets the waiters flag 22 and in a step 116 asserts the mutex interrupt 24.

A step 118 here depicts where the software task becomes "aware" that it has been interrupted. Of course, if the mutex controller 12 has not asserted the mutex interrupt 24, the software task simply "sees" step 112 next.

If the mutex interrupt 24 was asserted, however, in a step 120 that causes execution of the software task to divert to the interrupt exception handler of its processor (the processor running that software task, if multiple processors are present). Here the interrupt exception handler saves the state of the processor, including the parameters left in registers by the calling software task (back in step 102). In a step 122 control then passes to an interrupt service routine (ISR) in the mutex controller 12, where the OS kernel is invoked using a semaphore or other OS primitive. In a step 124 the OS kernel then handles the rest of the request to lock the HWM 10 in software, referring to the saved parameters stored for the state of the processor to enable options such as dealing with lock timeouts, blocking versus non-blocking, and priority inversions. After handling the lock request in step 124, the OS scheduler locates the highest priority software task that is currently in a runnable state, and in a step 126 execution continues with that task.

Figure 4:
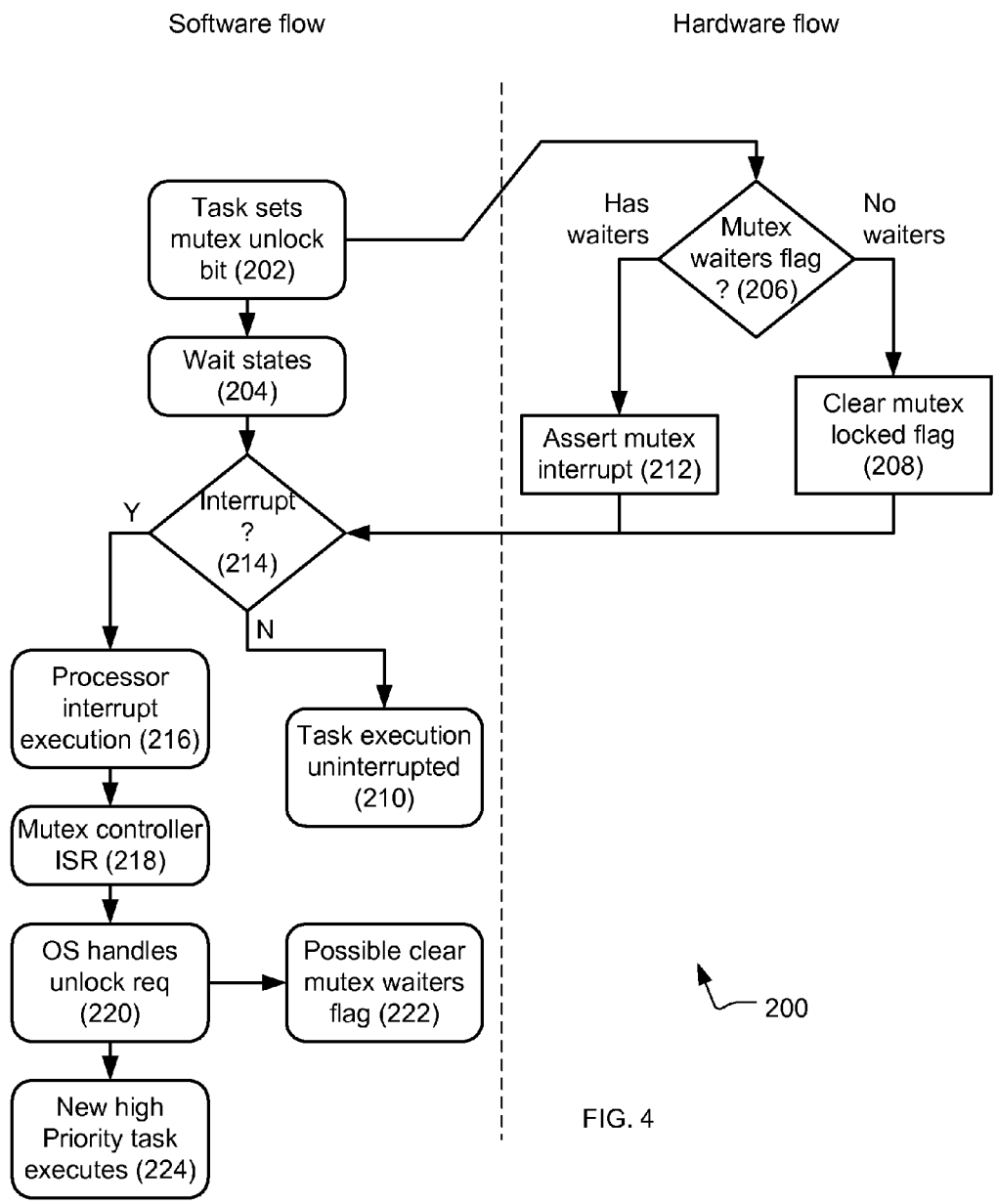
FIG. 4 is a flow chart showing a mutex unlock process in accord with the present invention.

FIG. 4 is a flow chart showing a mutex unlock process 200 in accord with the present invention. Again, software task related steps here are shown on the left and the shared hardware resource related steps are shown on the right.

In a step 202 an executing software task sets a mutex (un) lock bit in the unlock command register 16 and in an optional step 204 wait states can be inserted to prevent the software task from executing instructions while the mutex controller 12 evaluates and acts on the unlock request.

Separately, in a step 206 the mutex controller 12 monitors the state of the waiters flag 22 to determine if there are any software tasks waiting to lock the HWM 10. If the waiters flag 22 is not set, in a step 208 the mutex controller 12 clears the locked flag 20 (but does not assert the mutex interrupt 24). That is, it "silently" resets the flag and execution of the software task simply continues, with no interruption, at the instruction following the mutex unlock process 200 (and any optional wait states) (i.e., at a step 210). Alternately, however, if it is determined in step 206 that the waiters flag 22 is set, in a step 212 the mutex controller 12 asserts the mutex interrupt 24. A step 214 here depicts where the software task becomes "aware" that it has been interrupted. Of course, here as well, if the mutex controller 12 has not asserted the mutex interrupt 24, the software task simply "sees" step 210 next.

If the mutex interrupt 24 was asserted, however, in a step 216 this causes execution of the software task to divert to the interrupt exception handler of its processor (the processor running that software task, if multiple are present). Here the interrupt exception handler saves the state of the processor, including the parameters left in registers by the calling software task (back in step 102). In a step 218 control then passes to an interrupt service routine (ISR) in the mutex controller 12, where the OS kernel is invoked using a semaphore or other OS primitive. In a step 220 the OS kernel then handles the rest of the request to unlock the HWM 10 in software. Optionally, if there are no other software tasks waiting to lock the HWM 10, in a step 222 the OS kernel can also clear the waiters flag 22, by setting a clear bit in the clear waiter command register 18 that the mutex controller 12 monitors for. After handling the unlock request in step 220, the OS scheduler locates the highest priority software task that is currently in a runnable state, and in a step 224 execution continues with that task.

The handling of nested mutex locks can be handled in various manners, as a matter of design preference in embodiments of the HWM 10. Some OSes support nested locking of mutexes, or "counting" mutexes, where the same software task can lock a mutex that it already has locked. The approach described above for the HWM 10 forces the nested locks to be handled in software, since this otherwise would require the addition of a lock counter and an "owning task ID" for each mutex, as well as adding significant complexity to the mutex controller 12. Adding this complexity is an option, but it is not the present inventor's preferred approach. Instead it is recommended that any mutexes requiring nesting continue to be supported in software rather than by adding hardware to support such "corner cases." The inventive HWM 10 is, however, still flexible enough to use in conditions where occasional nesting will occur. Usually the fast hardware-based lock/unlock approach will be followed then, with occasional invocations of the OS to handle the nested operations in software.

Accordingly, returning now to the needs discussed in the Background Art section, it can now be appreciated that the inventive HWM 10 provides a mechanism that eliminates the lock and unlock overhead under non-contending conditions in the kernel of an OS, and that significantly reduces the burden of handling contention when it does occur. Notably, the HWM 10 permits doing this without disabling processor interrupts to check and manage mutexes. And under the HWM 10 priority inversions can be handled naturally, since the OS always gains control when a lock is attempted on a mutex that is already in the locked state and the OS lock routine can handle the priority inversion in its usual manner.

While various embodiments have been described above, it should be understood that they have been presented by way of example only, and that the breadth and scope of the invention should not be limited by any of the above described exemplary embodiments, but should instead be defined only in accordance with the following claims and their equivalents.

INDUSTRIAL APPLICABILITY

The hardware mutex (HWM 10) is well suited for application in modern computer systems where multiple software tasks (or threads of execution in a same software process) must contend for access to shared single-access hardware resources. As has been described herein, the inventive HWM 10 enables the locking and unlocking of critical sections in software process (i.e., the individual software tasks) with little or no overhead imposed on the operating system (OS) kernel.

For example, of particular importance today in the field of emerging portable computerized devices, the HWM 10 reduces the power requirements of multi-threaded real-time operating system (RTOS) when many mutex operations are performed at low clock rates. This applies especially when most heavy processing is done with hardware accelerators and the RTOS processor acts mostly in a caretaker role. The overall system interrupt latency is then also improved by reducing or eliminating the frequency and duration of software critical sections which are usually implemented by disabling processor interrupts. This then may allow dropping the processor clock rate even further.

The HWM 10 greatly simplifies the handling of hardware resources, by generally permitting mutex locks and waiters to be tracking within each hardware entity. For a lock operation, the OS only needs to be interrupted when a mutex is already locked, otherwise saving the locked state of the mutex silently with processor execution of the software task continuing with no interruption or critical section handling. Similarly, for an unlock operation, the OS only needs to be interrupted when a mutex has waiters, otherwise clearing the locked state of the mutex silently with execution proceeding with no interruption or critical section handling. The HWM 10 leaves mutex parameters in processor registers for the OS to collect if and only when lock fails and the OS gains control, thus reducing the interrupts that prior art approaches would require when a software task is blocked. Optionally, the HWM 10 can be embodied to handle nested mutexes in such a way that commonly used un-nested operations are dealt with quickly by hardware, while barely used nested operations are supported by the OS.

Furthermore, while the inventive HWM 10 has been described herein with respect to applications having clear and wide immediate need, the HWM 10 can be extended by one of ordinary skill in the art once the teachings herein are appreciated. For instance, the HWM 10 can be generalized to support a generic counting semaphore. The mutex use case may produce more needless trips through the OS kernel than other semaphore use cases, but this approach may still have utility in some situations. Or the inventive HWM 10 can be hooked up to multiple processors, each with its own mutex lock/unlock/waiter registers and corresponding interrupt signals to arbitrate multi-processor mutexes. A register indicating the processor that triggered the mutex interrupt can be added to improve efficiency, although the same implementation can be done entirely in software on each processor if desired.

For the above, and other, reasons, it is expected that the HWM 10 of the present invention will have widespread industrial applicability and it is therefore expected that the commercial utility of the present invention will be extensive and long lasting.

What is claimed is:

1. A method comprising:
   setting a bit in a register via a software task, said setting indicates a request to lock a hardware mutex, said hardware mutex comprises said register;
   after said setting, determining via a controller if said hardware mutex is locked, said hardware mutex comprises said controller;
   if it is determined said hardware mutex is not locked, setting a first flag using said controller to lock said hardware mutex without interrupting a kernel of an operating system, wherein said controller is implemented using hardware; and
   if it is determined said hardware mutex is locked, asserting via said controller an interrupt operable to interrupt said software task and enabling said kernel of said operating system to handle said request to lock said hardware mutex.

2. The method of claim 1, wherein said setting said first flag is performed transparently to said software task.

3. The method of claim 1 further comprising:
   if it is determined said hardware mutex is locked, setting via said controller a second flag to indicate that said software task is waiting for said hardware mutex to unlock.

4. The method of claim 1 further comprising:
   after said interrupt, saving a state of a processor executing said software task.

5. The method of claim 4, wherein said saving said state is performed by an interrupt exception handler of said processor.

6. The method of claim 4, wherein said saving said state further comprises saving data in at least one register of said processor, wherein said data comprises a parameter set by said software task, and wherein said parameter is selected from a group consisting of a wait timeout value, a block flag, and a non-blocking flag.

7. The method of claim 1 further comprising:
   after said interrupt, identifying another software task operable to run and executing said another software task.

8. The method of claim 1
   wherein said enabling is performed by an interrupt service routine of said controller.

9. The method of claim 1 wherein said determining if said hardware mutex is locked by determining if said first flag is set.

10. A system comprising:
    a software task operable to set a bit in a register;
    a hardware mutex comprising said register and a controller; and
    said controller implemented using hardware, said controller operable to:
    determine whether said software task has requested to lock said hardware mutex by monitoring if said bit is set in said register, said hardware mutex comprises said controller;
    if said bit is set, determine if said hardware mutex is locked;
    if it is determined said hardware mutex is not locked, set a first flag to lock said hardware mutex without interrupting a kernel of an operating system; and
    if it is determined said hardware mutex is locked, assert an interrupt operable to interrupt said software task and enable said kernel of said operating system to handle said request to lock said hardware mutex.

11. The system of claim 10, wherein said controller is further operable to set said first flag in a manner that is transparent to said software task.

12. The system of claim 10, wherein said controller is further operable to set a second flag to indicate that said software task is waiting for said hardware mutex to unlock if said hardware mutex is locked.

13. The system of claim 10, wherein said asserting of said interrupt is operable to cause a saving of a state of a processor executing said software task.

14. The system of claim 13, wherein said saving said state is performed by an interrupt exception handler of said processor.

15. The system of claim 13, wherein said saving said state further comprises saving data in at least one register of said processor, wherein said data comprises a parameter set by said software task, and wherein said parameter is selected from a group consisting of a wait timeout value, a block flag, and a non-blocking flag.

16. The system of claim 10, wherein said controller is further operable to determine if said hardware mutex is locked by determining if said first flag is set.

17. A method comprising:
setting a bit in a register via a software task, said setting indicates a request to unlock a hardware mutex, said hardware mutex comprises said register;
after said setting, determining via a controller if another software task is waiting to lock said hardware mutex, said hardware mutex comprises said controller;
if it is determined no other software task is waiting to lock said hardware mutex, clearing a first flag using said controller to unlock said hardware mutex without interrupting a kernel of an operating system, wherein said controller is implemented using hardware; and
if it is determined another software task is waiting to lock said hardware mutex, asserting via said controller an interrupt operable to interrupt said software task and enabling said kernel of said operating system to handle said request to unlock said hardware mutex.

18. The method of claim 17, wherein said clearing is performed transparently to said software task.

19. The method of claim 17 further comprising:
after said interrupt, saving a state of a processor executing said software task.

20. The method of claim 19, wherein said saving said state is performed by an interrupt exception handler of said processor.

21. The method of claim 19, wherein said saving said state further comprises saving data in at least one register of said processor, wherein said data comprises a parameter set by said software task, and wherein said parameter is selected from a group consisting of a wait timeout value, a block flag, and a non-blocking flag.

22. The method of claim 17 further comprising:
after said interrupt, saving a state of a processor executing said software task and clearing a second flag, wherein said second flag indicates whether another software task is waiting to lock said hardware mutex.

23. The method of claim 17 further comprising:
after said interrupt, identifying another software task operable to run and executing said another software task.

24. The method of claim 17 further comprising:
wherein said enabling is performed by an interrupt service routine of said controller.

25. The method of claim 17 wherein said determining if another software task is waiting to lock said hardware mutex by determining if a second flag is set.

26. A system comprising:
a software task operable to set a bit in a register;
a hardware mutex comprising said register and a controller; and
said controller implemented using hardware, said controller operable to:
determine whether said software task has requested to unlock of said hardware mutex by monitoring if said bit is set in said register;
if said bit is set, determine if another software task is waiting to lock said hardware mutex;
if it is determined no other software task is waiting to lock said hardware mutex, clear a first flag to unlock said hardware mutex without interrupting a kernel of an operating system; and
if it is determined another software task is waiting to lock said hardware mutex, assert an interrupt operable to interrupt said software task and enable said kernel of said operating system to handle said request to unlock said hardware mutex.

27. The system of claim 26, wherein said controller is further operable to clear said first flag in a manner that is transparent to said software task.

28. The system of claim 26, wherein said asserting of said interrupt is operable to cause a saving of a state of a processor executing said software task.

29. The system of claim 28, wherein said saving said state is performed by an interrupt exception handler of said processor.

30. The system of claim 28, wherein said saving said state further comprises saving data in at least one register of said processor, wherein said data comprises a parameter set by said software task, and wherein said parameter is selected from a group consisting of a wait timeout value, a block flag, and a non-blocking flag.

31. The system of claim 26, wherein said asserting of said interrupt is operable to cause a saving of a state of a processor executing said software task and clearing a second flag, wherein said second flag indicates whether another software task is waiting to lock said hardware mutex.

32. The system of claim 26, wherein said controller is further operable to determine if another software task is waiting to lock said hardware mutex by determining if a second flag is set.

33. The method of claim 1, wherein said enabling is performed by said controller.

* * * * *